United States Patent [19]

Leeker et al.

[11] Patent Number: 5,106,467
[45] Date of Patent: Apr. 21, 1992

[54] ALKALINE LEACHING OF GALVANIZED STEEL SCRAP

[75] Inventors: Jerald W. Leeker, Trenton; Joyce C. Neidringhaus; Ronald D. Rodabaugh, both of Middletown, all of Ohio

[73] Assignee: Armco Steel Company, L.P., Middletown, Ohio

[21] Appl. No.: 593,435

[22] Filed: Oct. 5, 1990

[51] Int. Cl.$^5$ ............................................. C25C 1/16
[52] U.S. Cl. .................................. 204/114; 204/116; 423/109
[58] Field of Search .................. 204/114, 116; 423/109

[56] References Cited

U.S. PATENT DOCUMENTS

| | | | |
|---|---|---|---|
| 700,563 | 5/1902 | Sadtler | 204/116 |
| 983,931 | 2/1911 | Ramage | 204/116 |
| 1,929,927 | 10/1933 | Laird | 423/109 |
| 2,241,585 | 5/1941 | Day, Jr. | 204/146 |
| 3,905,882 | 9/1975 | Hudson | 204/119 |
| 4,056,450 | 11/1977 | McCauslan et al. | 204/201 |
| 4,474,655 | 10/1984 | Giezen | 204/121 |

FOREIGN PATENT DOCUMENTS

| | | |
|---|---|---|
| 892897 | 10/1982 | Belgium . |
| 1193996 | 9/1985 | Canada . |
| 73186 | 3/1983 | European Pat. Off. . |
| 2397472 | 3/1979 | France . |

Primary Examiner—John Niebling
Assistant Examiner—David G. Ryser
Attorney, Agent, or Firm—R. J. Bunyard; L. A. Fillnow; R. H. Johnson

[57] ABSTRACT

Caustic dezincing galvanized steel scrap. A dezincing plant includes a plurality of tanks interconnected in series with steel scrap sequentially being moved through each of the tanks. The tanks contain a caustic leaching solution including an oxidant with the leaching solution being circulated through each of the tanks in a direction opposite to the movement of the scrap. Fresh scrap initially is exposed to a partially depleted leaching solution with the oxidant concentration of the leaching solution increasing as the scrap moves through the series of tanks. Leaching solution depleted of its oxidant is transferred to an electrolytic cell where zinc is removed and plated as metallic zinc powder onto a cathode. The leaching solution is recycled by removing zinc. The chemistry of the leaching solution is controlled so that sufficient free caustic is present to prevent passivating zinc coating on the scrap. Oxidant is added to the recycled solution and the caustic concentration is adjusted, if necessary, to have a total caustic concentration of at least 5 M and the recycled solution is returned to the last tank. Compressed scrap bales are dezinced and ready for use as a melting furnace charge material.

17 Claims, 3 Drawing Sheets

ALKALINE LEACHING OF GALVANIZED STEEL SCRAP

BACKGROUND OF THE INVENTION

The invention relates to new and useful improvements in apparatus and method for the removal of zinc and zinc alloy coatings from steel scrap and recovery of zinc. More particularly, the invention relates to moving galvanized scrap sequentially through a plurality of leaching tanks connected in series, transferring a caustic leaching solution containing an oxidant through the leaching tanks in a direction opposite to the movement of the scrap, transferring exhausted leaching solution when the oxidant is substantially depleted to means for removing zinc to recycle the solution and then returning the solution back through the tanks after zinc is removed.

A major concern to the steel industry is the growing quantity of basic oxygen furnace (BOF) and electric arc furnace (EAF) baghouse and wet scrubber dusts containing elevated levels of heavy metals such as zinc, cadmium and lead. In previous years when galvanized steels were produced in smaller volumes, these dusts could be recycled through the normal sinter plant-blast furnace-BOF processing loop. Due to accelerating trends towards greater use of galvanized flat rolled steel in autobodies for corrosion protection, increasing amounts of galvanized scrap at automobile stamping plants have been accumulating. Recycling of large amounts of galvanized steel scrap directly through a BOF or an EAF is undesirable because zinc vaporizes during the melting process and significantly increases the zinc content of the flue dust. Flue dust having a high zinc content, i.e., zinc oxide, is unacceptable feedstock for recycling as sinter to a blast furnace because zinc escapes from the sinter by being vaporized after it is reduced to metallic zinc in the blast furnace. The zinc vapors condense on furnace refractories and can destroy the refractory lining. Consequently, much of the flue dust from a BOF containing zinc is disposed of as a waste because the available recycling processes are uneconomical. This represents poor utilization of resources since the iron and zinc units are disposed of rather than recovered.

Coating metals have heretofore been removed from steel scrap both for recovery of the coating metal and recycling of the deplated steel scrap to a steel making furnace. U.S. Pat. No. 3,905,882 discloses a process for counterflow sulfuric acid leaching of galvanized steel scrap and recovery of metallic zinc from the solution in a separate electrolytic cell. Fresh galvanized scrap is placed into a first tank containing concentrated acid. After this scrap is about one-half dezinced, fresh scrap is placed into a second tank. The now weak acid from the first tank is circulated to the second tank and concentrated acid returned from the electrolytic cell is recirculated to the first tank. Although acids are good deplaters of zinc coatings, acids generally are unacceptable because acids severely corrode iron based materials and require higher cost polymeric based materials for the dezincing plant equipment and acids dissolve iron from the scrap during the leaching process thereby requiring expensive purification schemes to produce a high purity metallic zinc by-product.

Canadian patent 1,193,996 discloses a process using an electrolytic cell both for dezincing galvanized steel scrap and for recovering metallic zinc from the leaching solution. This process uses an electrolytic cell containing mercury and an alkaline solution. Scrap is carried into the leaching solution on an anode conveyor chain with the mercury acting as the cathode for deposition of zinc. The formed mercury amalgam is recirculated through another cell wherein the zinc is separated onto another cathode.

U.S. Pat. No. 4,056,450 discloses a tank for detinning steel scrap and recovery of tin. The tank includes a rotatable perforated anode drum and a caustic leaching solution. Shredded scrap is fed to the drum through a chute, a helical member moves the scrap through the drum and detinned scrap exits the discharge end of the drum onto a conveyor. Tin is electrowinned from the leaching solution onto cathodes suspended from a bus bar within the tank. Leaching solutions having concentrations of 1-20% NaOH or 1-40% KOH are disclosed with the operating temperature maintained at 82° C.

The processes disclosed in either of the latter two patents are unacceptable because they are very inefficient. Using electric current to anodically remove a coating metal from steel scrap by dissolving in a leaching solution and simultaneously electrowinning the dissolved metal by cathodic deposition from a leaching solution within a leaching tank results in low utilization of the current passing through the leaching tank. Anodic dissolution of coating metal from steel scrap requires "line-of-sight" alignment between the coated steel surface (anode) and the cathode for high electrical efficiency. Dissolution may not be effective during high volume scrap processing or when processing scrap compressed into bales.

Because of increasing usage of zinc coated steels, uncoated steel scrap will become increasingly less available and its cost will escalate. Usage of greater amounts of zinc coated steel scrap in BOF or EAF furnaces will result in increased concentrations of heavy metals in dust captured in furnace gas cleaning equipment. Accordingly, there remains a need for a process for zinc removal from galvanized steel scrap that is fast and relatively inexpensive. Furthermore, there is a need for a process that is environmentally safe, does not produce waste by-products which are expensive or difficult to handle, does not cause operator discomfort and does not corrode the operating equipment.

BRIEF SUMMARY OF THE INVENTION

The invention relates to dezincing of steel scrap using a caustic leaching solution containing an oxidant in a plurality of leaching tanks interconnected in series. Galvanized steel scrap sequentially is moved through the tanks from first to last with the leaching solution transferred through the tanks from last to first. After being substantially depleted of its oxidant, the exhausted solution is transferred from the first tank to means for removing zinc to recycle the solution and the dezinced scrap in the last tank is ready for use as a melting furnace charge material. After zinc is removed and oxidant added, the recycled caustic solution is returned to the last tank.

A principal object of the invention is to provide an economical process for removal of galvanized coatings from steel scrap without producing an environmentally burdensome waste by-product.

An additional object is to provide a process for producing improved steel scrap that results in minimum zinc and lead content in BOF or EAF flue dust.

Another object is being able to use commercially available forms of galvanized scrap as a charge material in a BOF and recovering iron units from the produced flue dusts in a blast furnace.

Another object is being able to dezinc commercially available forms of scrap in less than one hour.

Another object is being able to convert by-product zinc to a commercially reusable form.

A feature of the invention includes moving galvanized steel scrap through a plurality of leaching tanks interconnected in series sequentially from the first tank to the last tank and simultaneously dezincing the scrap by transferring a caustic leaching solution containing an oxidant through the tanks sequentially from the last tank to the first tank.

Another feature of the invention includes transferring the solution from the first tank when the oxidant has been substantially depleted to means for removing zinc to recycle the solution.

Another feature of the invention includes the removing means being an electrolytic cell for cathodic powder deposition of metallic zinc.

Another feature of the invention includes returning the recycled caustic solution after removing zinc to the last leaching tank.

Another feature of the invention includes controlling the caustic concentration of the leaching solution so that the solution includes free caustic when the solution is transferred to the removing means.

Another feature of the invention includes the leaching solution having a total caustic concentration of at least about 5M.

Another feature of the invention includes returning the recycled leaching solution after removing zinc to the last leaching tank with the solution having a free caustic concentration of at least about 3M.

Advantages of the invention include environmentally safe reuse of limited natural resources, producing commercially reusable metallic zinc by-products, producing steel scrap having minimal zinc content suitable as a charging material for basic oxygen and electric furnaces, preventing zinc from being introduced into the basic oxygen and blast furnace process loop, reducing the dust loading of furnace gas cleaning equipment, and use of inexpensive low carbon steel as construction materials for the processing equipment.

DETAILED DESCRIPTION OF THE PREFERRED EMBODIMENT

The invention relates to dezincing of galvanized steel scrap in a plurality of tanks using a caustic leaching solution containing an oxidant, recovering a zinc by-product from the leaching solution and returning the recycled solution back to the leaching tanks after zinc is removed. The scrap sequentially is moved through the leaching tanks from first to last while the leaching solution is transferred through the tanks from last to first with the leaching solution in the first tank having a zinc concentration greater than that of the leaching solution in the other tanks. After the oxidant is substantially depleted and thereby minimizing the dezincing capacity of the leaching solution in the first tank, the solution in the first tank is transferred to means for removing zinc to recycle the solution. After zinc is removed and oxidant is added, the recycled solution is returned to the last tank. The dezinced scrap in the last tank can be used as a melting furnace charge material.

The invention includes recovering a zinc by-product from the leaching solution and returning the recycled solution back to the leaching tanks. To have application in industry, the economics for dezincing galvanized steel scrap with caustic requires the leaching solution be reused. Accordingly, zinc must be removed, preferably as a sellable by-product, from the solution.

Figure 1:
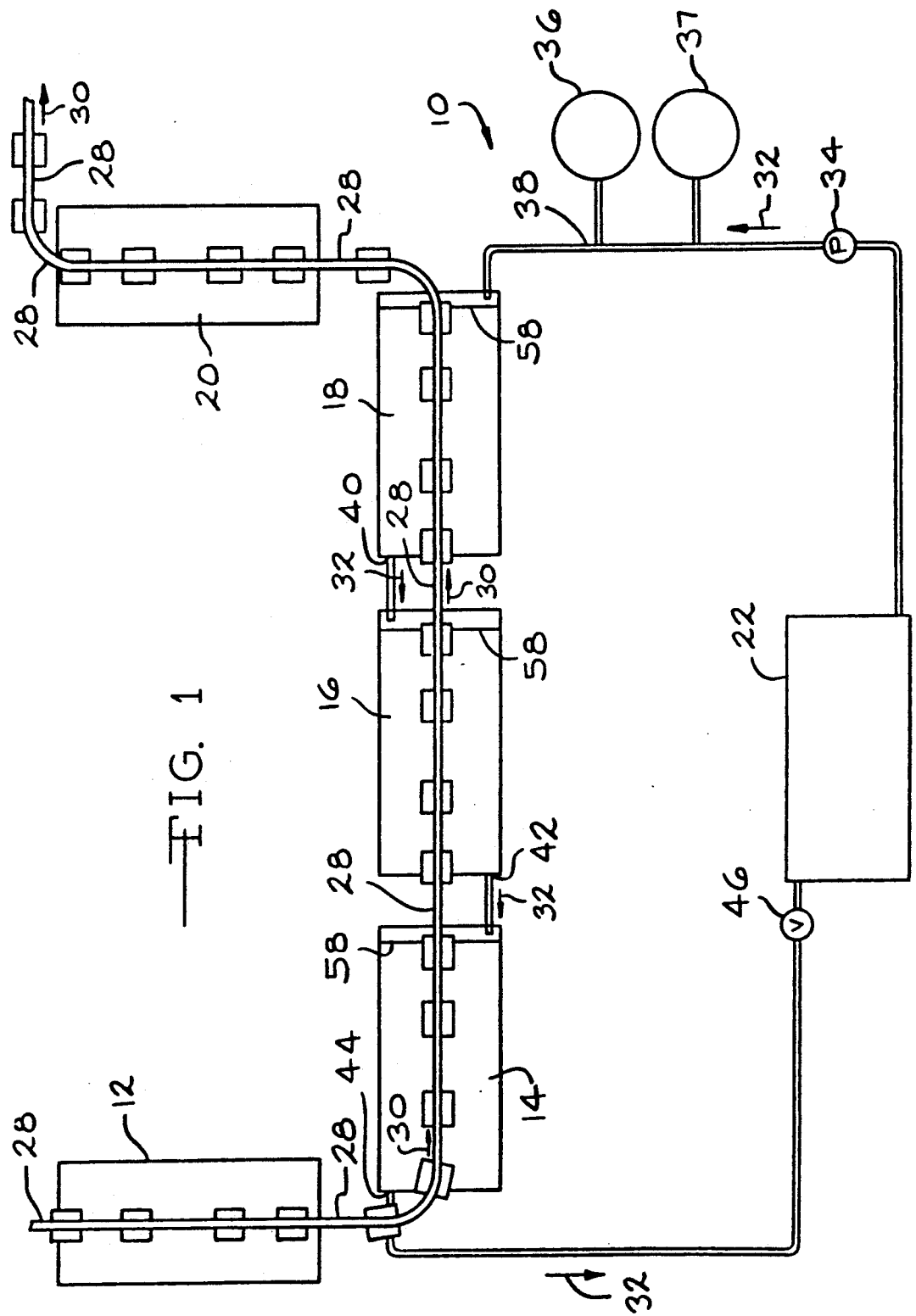
FIG. 1 is a schematic view illustrating steel scrap movement and leaching solution circulation through a dezincing plant.

The invention will be more fully understood from the following detailed description of the drawings. Referring to FIG. 1, reference numeral 10 generally illustrates a preferred embodiment of an apparatus for dezincing of galvanized steel scrap by counterflowing a caustic leaching solution and means for removing zinc to recycle the leaching solution. Dezincing apparatus 10 includes a cleaning Tank 12, leaching Tanks 14,16,18 interconnected in series, a rinsing Tank 20 and means 22 for removing zinc from the leaching solution whereby the solution is recycled. Galvanized steel scrap such as loose clippings or compressed bales first are immersed into the caustic leaching solution contained in Tank 14. The scrap sequentially is immersed into caustic leaching solutions contained in Tank 16 and then in Tank 18. For galvanized steel scrap additionally coated with oil, soap, paint, and the like, which undesirably may otherwise contaminate the leaching solution or the recovered metallic zinc by-product, the fresh steel scrap may initially be cleaned in Tank 12 to remove the organic coating. After the zinc coating is stripped from the scrap in Tanks 14,16,18, the dezinced scrap preferably is rinsed with an aqueous solution to remove any remaining leaching solution in Tank 20. Thereafter, the dezinced scrap is ready for use as a charge material in a steel melting furnace such as a BOF or an EAF. Apparatus 10 also includes a conveyance for moving the scrap sequentially through the tanks such as conveyors, baskets, buckets, hooks, magnets and the like and means for circulating the leaching solution through the leaching tanks. Unlike acid leaching systems requiring insoluble polymeric materials, apparatus 10 may be constructed from relatively inexpensive materials such as mild carbon steel. Preferably, the scrap is continuously moved through the tanks on a series of conveyors 28 with the scrap material movement direction indicated by the arrows 30. The leaching solution is circulated through leaching Tanks 18,16,14 in a direction opposite to that of the movement of the steel scrap, i.e., counterflowed, as indicated by the arrows 32. Concentrated caustic leaching solution is utilized by being added to the last leaching tank of the series. In the embodiment illustrated in FIG. 1, zinc is removed from the leaching solution and recycled by means 22. Make-up caustic may be provided from a Tank 36 and the leaching solution oxidant may be provided from a Tank 37 to reconstitute the recycled leaching solution. The make-up caustic and oxidant are added to the leaching solution through a pipe 38. The reconstituted solution then is returned to Tank 18. In some situations, it may not be desirable to immediately return the recycled solution from removing means 22. In this situation, another tank (not shown) may be used as a temporary holding tank for the recycled solution. The leaching solution is transferred through Tanks 18,16,14, i.e., last to first, preferably being continuously circulated by a pump 34. Preferably, the inlet and outlet of a tank are at different elevations as will be more fully explained in reference to FIG. 2. Circulation of the leaching solution to removing means 22 may be regulated by a valve 46.

It was indicated above preferably the scrap is continuously moved through and the leaching solution continuously pumped through the dezincing tanks. It will be understood the dezincing of the scrap could be accomplished by batch processing as well. For example, the scrap could be supported in one or more baskets with the scrap in one dezincing tank being moved all at once after a predetermined period of dezincing time to the next dezincing tank in the sequence. In a similar manner, the entire leaching solution in each dezincing tank could be transferred to the preceding dezincing tank in the sequence after a predetermined period of time.

Figure 2:
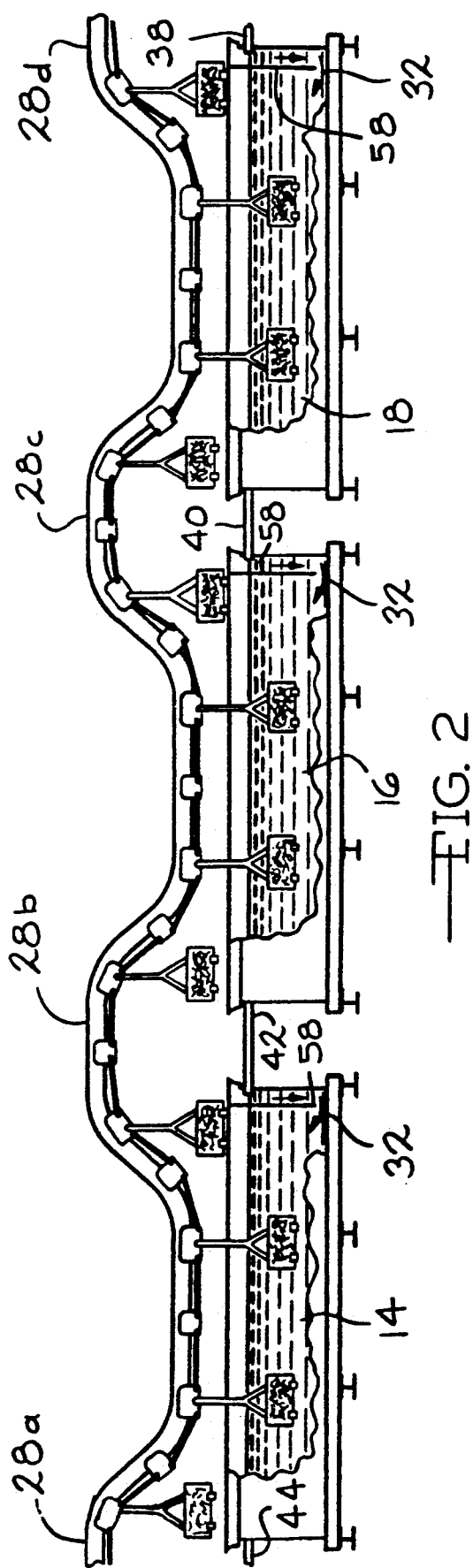
FIG. 2 is an schematic elevation view, partially in section, illustrating the dezincing tanks of FIG. 1.

FIG. 2 illustrates in more detail the dezincing tanks of FIG. 1 interconnected in series. Fresh galvanized steel scrap enters the first tank (Tank 14) along conveyor 28a. After being partially dezinced while moving through Tank 14, the scrap is moved to Tank 16 by conveyor 28b. After being nearly dezinced while moving through Tank 16, the scrap is moved to the last tank (Tank 18) by conveyor 28c. After being dezinced in the last tank, the "black" scrap is removed from Tank 18 by conveyor 28d. Concentrated leaching solution is returned to Tank 18 through pipe 38 from removing means 22 by pump 34. Partially depleted leaching solution flows from Tank 18 to Tank 16 through an outlet 40 and then to Tank 14 through an outlet 42. Solution depleted of oxidant then is transferred to removing means 22 through outlet an 44. Each tank is provided with means for directing the incoming leaching solution toward the bottom of each tank such a baffle 58. By causing the incoming leaching solution (arrows 32) to follow a tortuous path through a dezincing tank from a lower elevated inlet to a higher elevated outlet results in better mixing and more efficient dezincing by the oxidant contained in the leaching solution.

It is anticipated at least 90% of the zinc coating will be removed from the scrap by the time the scrap is removed from Tank 18. Preferably, 95% or more of the zinc coating will be removed. Less than 100% dezincing can be expected when dezincing baled scrap because the internal surfaces of some tightly compressed laminations of a bale may not be accessible to the leaching liquid.

Figure 3:
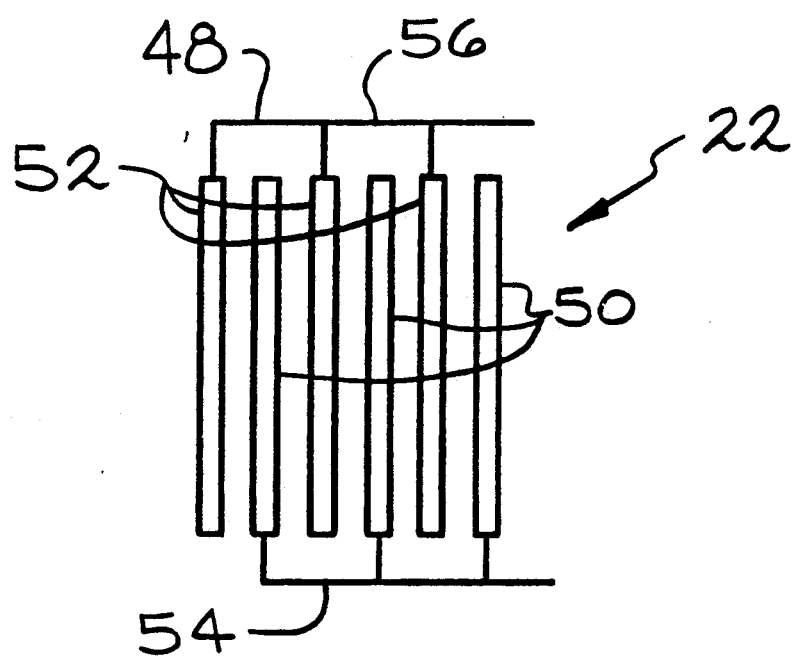
FIG. 3 is a schematic plan view illustrating an electrolytic cell for removing zinc from the leaching solution.

FIG. 3 illustrates in schematic a preferred embodiment of removing means 22. Removing means 22 illustrated is an electrolytic cell 48 and includes a plurality of anode plates 50 alternately mounted in parallel with a series of cathode plates 52. Anodes 50 are coupled to a conductor 54 and cathodes 52 are coupled to a conductor 56 insulated from conductor 54. Anodes 50 may be a ferrous or nonferrous metal or a ferrous base metal coated with a nonferrous metal. Suitable metals for this purpose are those that are not soluble in a caustic solution such as nickel, stainless steel, cobalt, platinum and the like. Cathodes 52 also may be a ferrous or nonferrous metal or a ferrous base metal coated with a nonferrous metal. Suitable metals for this coating include lead, titanium, nickel, and the like. Direct current is supplied to anodes 50 from a power source (not shown) and passed through the solution containing the dissolved zinc. Metallic zinc powder is plated onto cathodes 52. Periodically, cathodes 52 are removed from cell 48 and the plated zinc removed.

Operation of apparatus 10 now will be described in specific detail by way of example. To simulate operation of a three tank continuous dezincing plant at equilibrium, a laboratory experiment was conducted using three 600 ml capacity dezincing tanks and a 600 ml capacity electrolytic cell. The electrolytic cell included a lead coated steel plate cathode evenly spaced between a pair nickel coated steel plate anodes. Dezincing solutions containing a total concentration of 5M NaOH were placed in each of the three tanks used to simulate dezincing Tanks 14,16,18. Different amounts of $NaNO_3$ as the oxidant and ionic zinc were added to each tank to form dezincing solutions containing about 0.02M $NaNO_3$ plus about 35 g/l zinc, 0.04M $NaNO_3$ plus about 30 g/l zinc and 0.08M $NaNO_3$ plus about 20 g/l zinc in Tanks 14, 16, and 18 respectively. The solution in the electrolytic cell, i.e., cell 48, contained a zinc concentration of about 40 g/l and less than 0.01M $NaNO_3$. The solutions in all three tanks were maintained at about 66° C. Each of the three dezincing tanks was provided with a small scrap charge, simulated by using a small coil of hot dip galvanized steel. After fifteen minutes, dezincing was stopped by removing the coils. Each of the coils was weighed to determine zinc weight loss in each of the three dezincing tanks. The coil from the first Tank 14 then was placed into second Tank 16. The coil from Tank 16 then was placed into last Tank 18. A fresh coil then was placed in Tank 14. The coil from Tank 18 was completely dezinced. The coils were dezinced again for fifteen minutes, weighed to determine the zinc loss and returned to the dezincing tanks in the sequence previously described. This sequencing was continued until the weight loss from the coil exiting Tank 14 decreased to below 0.5 g which was about 10% of the total weight loss expected for complete dezincing. Simultaneously while the dezincing operation was being carried out, zinc was electroplated in electrolytic cell 48 so that the zinc concentration was reduced from about 40 g/l to about 20 g/l. When the zinc weight loss from the coil exiting Tank 14 decreased to below 0.5 g, the solution from electrolytic cell 48 was transferred to a holding tank and the solution from Tank 14 was transferred to electrolytic cell 48. The solution from Tank 16 was transferred to Tank 14 and the solution from Tank 18 was transferred to Tank 16. $NaNO_3$ (3.74 g) was added to the solution in the holding tank and this solution was returned to Tank 18. The solution in Tank 18 now contained about 20 g/l zinc and about 0.08M $NaNO_3$. This "operating window" for dissolved zinc was maintained throughout the experiment. The total caustic concentration remained at about 5M.

The possible equations for dezincing when using NaOH and $NaNO_3$ are as follows:

$$NaNO_3 + 7NaOH + 4Zn^0 + 6H_2O = 4Na_2Zn(OH)_4 + NH_{3(g)}. \quad (1)$$

$$2NaNO_3 + 8NaOH + 5Zn^0 + 6H_2O = 5Na_2Zn(OH)_4 + N_{2(g)}. \quad (2)$$

The quantity of zinc coating per kilogram of sodium nitrate will depend upon the reaction stoichiometry. From (1), 1 kg of sodium nitrate will remove 3.08 kg of zinc coating, and from equation (2), 1 kg of sodium nitrate will remove 1.92 kg of zinc coating.

Electrolytic cell 48 was constructed by positioning an anode plate 50 about 32 mm from each side of cathode plate 52 so that zinc would be plated on both sides of cathode plate 52. A rectifier was used as the power source. The current was set at 7.9 amps for a period of time of 1.27 hours to maintain the operating window described above. Metallic zinc powder was plated onto cathode 50. This zinc powder by-product was easily removed from the cathode, was fine grained, had high purity, and was easily compacted into dense pellets for storage and transporting. Chemical analysis determined the powder was at least 99% zinc or zinc compounds and contained 82-89% metallic zinc. Plating efficiencies also were calculated and varied between 90-99%. The primary variable effecting plating efficiency was the amount of oxidant remaining in the solution when the depleted leaching solution was transferred from Tank 14 to the electrolytic cell 48. The oxidant concentration varied between 0.00–0.08M.

The equations for electrowinning dissolved zinc when using NaOH and NaNO₃ are as follows:

Cathodic Reaction:

$$Na_2Zn(OH)_4 + 2e^- = Zn^o + 2NaOH + 2OH^-.$$

Anodic Reaction:

$$H_2O = 2H^+ + \tfrac{1}{2}O_2 + 2e^-.$$

Overall Reaction:

$$Na_2Zn(OH)_4 = Zn^o + 2NaOH + \tfrac{1}{2}O_{2(g)} + H_2O.$$

From our experiments, it was determined caustic solutions must include an oxidant to have practical industrial application to dezinc galvanized steel scrap, particularly when the scrap is in the form of compressed bales. A typical scrap bale weighs about 815 kg having about 70% void space. For NaOH caustic solution, we determined the initial oxidant concentration of the leaching solution in last dezincing Tank 18 should be at least about 0.08M when NaNO₃ is used as the oxidant. This initial concentration of oxidant allows sufficient oxidant to be circulated to first dezincing Tank 14 to complete dezincing by the time the scrap is removed from last Tank 18. Some dezincing must occur in the first and second tanks so that the dezincing necessary in the last tank is not overly burdensome within the immersion time constraints predetermined for the scrap in each tank. If the oxidant is depleted before the leaching solution is circulated to the inboard side of Tank 14, insufficient or no dezincing occurs while the scrap is immersed in Tank 14. We determined that no more than about 25% of the zinc coating need be removed in the first dezincing tank when using a three dezincing tank system. Since the oxidant concentration is substantially greater in the second dezincing tank, greater dezincing can be expected to occur. We determined that at least 75% of the zinc coating should be removed by the time the scrap is removed from the second dezincing tank. With only about 25% of the original zinc coating remaining on the scrap when it is immersed into the last tank, the concentrated leaching solution being circulated to the inboard side of the last tank easily removes any zinc coating remaining before the scrap is removed from the last tank.

In the experiments described above, solutions containing a total NaOH concentration of about 5M and 0.02M NaNO₃ plus about 35 g/l zinc, 0.04M NaNO₃ plus about 30 g/l zinc and 0.08M NaNO₃ plus about 20 g/l zinc were placed in Tanks 14, 16, and 18 respectively. In a continuous three tank dezincing operation, it is contemplated that these will be the approximate concentrations of the leaching solutions entering Tanks 14,16,18 from Tanks 16,18 and electrolytic cell 48 respectively. By the time the leaching solution has circulated through a dezincing tank and is about to transfer to the next dezincing tank in the series, e.g., Tank 18 to Tank 16 and Tank 16 to Tank 14, it is contemplated the leaching solution exiting Tank 14 would have a concentration of less than about 0.01M NaNO₃ plus about 40 g/l zinc, the leaching solution exiting Tank 16 would have a concentration of about 0.02M NaNO₃ plus about 35 g/l zinc and the leaching solution exiting Tank 18 would have a concentration of about 0.04M NaNO₃ plus about 30 g/l zinc. The depleted leaching solution exiting Tank 14 is transferred to electrolytic cell 48. It will be understood by a depleted or exhausted leaching solution is meant the oxidant concentration is such that the solution otherwise would not have been capable of removing more than about 10% of the original zinc coating weight from the scrap in the first tank, e.g., less than about 0.01M NaNO₃.

As indicated above, it also was determined plating efficiency was a function of the oxidant concentration remaining in the leaching solution when transferred from the outboard side of the first tank. Some oxidant should be present when the leaching solution is circulated to the inboard side of Tank 14. The amount of the oxidant initially present at the inboard side of the tank must be such so that it is substantially consumed, i.e., less than about 0.01M NaNO₃, by the time the leaching solution is circulated through the outboard side of the tank and transferred to the electrolytic cell. We determined the amount of oxidant concentration present in the leaching solution when transferred to the electrolytic cell should not exceed about 0.008M so that the plating efficiency in the electrolytic cell is at least 90%, and preferably the oxidant concentration should be less than 0.005M. Plating efficiency also is a function of the amount of zinc removed from the solution before returning the solution back to Tank 18. Preferably, plating is continued until no more than about 20 g/l Zinc remains in the solution. A further decrease in the zinc concentration when transferring the solution to Tank 18 reduces the electrical plating efficiency. Although the zinc concentration could be decreased to as low as 5-10 g/l, the efficiency might be reduced to less than 90%.

In addition to the amount of oxidant present, another consideration effecting dezincing efficiency is the minimum concentration of caustic present in the leaching solution. It is known that at least a 5M total concentration of caustic is necessary to keep about 50 g/l zinc in solution. More importantly; however, it was determined at least about 3M "free" NaOH should be present in the leaching solution to sustain the dezincing reaction. If some free caustic is not present before dezincing is completed, the zinc surface becomes passivated and the dezincing reaction stops. By free NaOH is meant NaOH which is not combined with zinc or other metals in solution. More preferably, the leaching solution entering the last tank should have a concentration of free caustic at least about 3M and most preferably at least about 5M.

It will be understood various modifications can be made to the invention without departing from the spirit and scope of it. For example, by galvanized steel scrap will be understood to include zinc, zinc based alloys, zinc-iron alloys and zinc-nickel alloys coated onto steel substrates by hot dipping, electroplating and the like. Although the only caustic used was NaOH and the only oxidant used was NaNO$_3$, a hydroxide of alkali metals such as KOH could be used as the caustic and an oxidant from the group consisting of alkali metal nitrate and nitrite could be used, e.g., KNO$_3$, HNO$_3$, NaNO$_2$ and KNO$_2$. The concentrations of the caustic and oxidant can vary depending upon such factors as the type of zinc coating, coating method used to apply the zinc coating, thickness of the zinc coating, leaching solution temperature, scrap immersion time in the leaching solution, zinc removal method, and the like. Therefore, the limits of the invention should be determined from the appended claims.

We claim:

1. A method of dezincing steel scrap, comprising the steps of: providing a plurality of tanks,
    sequentially moving galvanized steel scrap through said tanks from first to last, sequentially transferring a caustic leaching solution including an oxidant through said tanks from last to first,
    transferring said leaching solution in said first tank to means for removing zinc from said leaching solution,
    removing said zinc from said solution by said zinc removing means whereby said leaching solution is recycled,
    returning said recycled leaching solution from said zinc removing means to said last tank,
    said recycled leaching solution having a free caustic concentration of at least about 3M when returned to said last tank, and
    removing said scrap from said last tank whereby said scrap is dezinced and ready for use as a melting furnace charge material.

2. The method of claim 1 wherein said caustic solution is a hydroxide formed from an alkali metal.

3. The method of claim 1 wherein said oxidant is from the group consisting of alkali metal nitrate and nitrite.

4. The method of claim 1 wherein said caustic solution is NaOH and said oxidant is NaNO$_3$.

5. The method of claim 4 wherein said solution transferred from said first tank to said zinc removing means has a concentration of no greater than 0.008M of said NaNO$_3$.

6. The method of claim 1 wherein said solution transferred from said first tank to said zinc removing means has a concentration of less than about 0.01M of said oxidant.

7. The method of claim 1 wherein said solution has a total caustic concentration of at least about 5M.

8. The method of claim 1 wherein said recycled solution has a concentration no greater than about 20 g/l of said zinc.

9. The method of claim 1 wherein said solution transferred from said first tank to said zinc removing means includes free caustic.

10. The method of claim 1 including the additional steps of:
    providing a cleaning tank,
    moving said scrap through said cleaning tank prior to commencing said dezincing.

11. The method of claim 1 including the additional steps of:
    providing a rinsing tank,
    moving said dezinced scrap through said rinsing tank to remove said leaching solution.

12. The method of claim 1 wherein said scrap is compressed bales.

13. The method of claim 1 including the additional step of adding said oxidant to said recycled solution.

14. The method of claim 1 wherein said scrap is moved through said tanks by a conveyor and said leaching solution is pumped to said zinc removing means.

15. The method of claim 1 wherein said scrap is continuously moved through said tanks and said leaching solution is continuously circulated through said tanks and said zinc removing means.

16. A method of dezincing steel scrap, comprising the steps of:
    providing at least three tanks,
    sequentially moving galvanized steel scrap through said tanks from first to last,
    sequentially circulating a caustic leaching solution including an oxidant through said tanks from last to first,
    transferring said leaching solution in said first tank to an electrolytic cell for removing zinc from said leaching solution,
    said leaching solution transferred to said electrolytic cell including free caustic and less than about 0.01M said oxidant,
    electrowinning said zinc from said leaching solution whereby said leaching solution is recycled,
    returning said leaching solution from said electrolytic cell to said last tank, said returned solution including a total caustic concentration of at least about 5M and no more than about 20 g/l zinc, and
    removing said scrap from said last tank wherein said scrap is dezinced and ready for use as a melting furnace charge material.

17. The method of claim 16 wherein no more than about 25% of the zinc coating on said scrap is removed in said first tank and 50% of the zinc coating on said scrap is removed in the second of said tanks.

* * * * *